(12) United States Patent
Herrmann

(10) Patent No.: US 12,257,951 B2
(45) Date of Patent: Mar. 25, 2025

(54) INTERIOR REARVIEW DEVICE WITH HUMAN MACHINE INTERFACE AND VEHICLE THEREWITH

(71) Applicant: MOTHERSON INNOVATIONS COMPANY LIMITED, London (GB)

(72) Inventor: Andreas Herrmann, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 539 days.

(21) Appl. No.: 17/626,596

(22) PCT Filed: Jul. 23, 2020

(86) PCT No.: PCT/EP2020/070782
§ 371 (c)(1),
(2) Date: Jan. 12, 2022

(87) PCT Pub. No.: WO2021/018722
PCT Pub. Date: Feb. 4, 2021

(65) Prior Publication Data
US 2022/0242313 A1      Aug. 4, 2022

(30) Foreign Application Priority Data

Jul. 29, 2019   (DE) ...................... 10 2019 120 382.1

(51) Int. Cl.
| | |
|---|---|
| *B60R 1/12* | (2006.01) |
| *F21V 8/00* | (2006.01) |
| *G02B 7/182* | (2021.01) |

(52) U.S. Cl.
CPC ............... *B60R 1/12* (2013.01); *G02B 6/006* (2013.01); *G02B 6/0068* (2013.01); *G02B 7/182* (2013.01); *B60R 2001/1223* (2013.01)

(58) Field of Classification Search
CPC ... B60R 1/12; B60R 2001/1223; G02B 6/006; G02B 6/0068; G02B 7/182; G02F 1/15; G02F 1/155; G02F 1/163
(Continued)

(56) References Cited

U.S. PATENT DOCUMENTS

| | | | |
|---|---|---|---|
| 2012/0236388 A1 | 9/2012 | De Wind et al. | |
| 2016/0373110 A1* | 12/2016 | Koehne | .................. F21V 23/04 |
| 2017/0160874 A1 | 6/2017 | Wieczorek et al. | |

FOREIGN PATENT DOCUMENTS

| | | |
|---|---|---|
| DE | 102015201901 A1 | 8/2016 |
| WO | WO 2018/167096 A1 | 9/2018 |

OTHER PUBLICATIONS

German Office Action dated Jan. 31, 2020 of DE 10 2019 120 382.1.
(Continued)

*Primary Examiner* — Tuyen Tra
*Assistant Examiner* — Rahman Abdur
(74) *Attorney, Agent, or Firm* — Jones Day

(57) ABSTRACT

The present disclosure refers to an interior rearview device adapted for use with a motor vehicle, comprising: a rearview element comprising at least one of a reflective element and a display element; a bezel surrounding the rearview element and being surrounded by a housing; a mount assembly which is configured to attach the housing to the vehicle; and an human machine interface (HMI) for controlling at least one function of the interior rearview device, with the HMI comprising at least one ToF sensor, between the housing and the rearview element, and at least a part of the bezel, preferably at the bottom of the interior rearview device. The bezel (32, 1320) comprises a transparent and/or translucent substrate provided with a, preferably chromium-based, reflective coating (12000), with at least one opening or region of reduced thickness of the coating (12000) being provided on the substrate and/or being hidden by the coating
(Continued)

(12000) until the at least one light source is lit, and providing at last one logo, sign, mark, icon and/or information on a function to be actuated via the HMI.

18 Claims, 11 Drawing Sheets

(58) Field of Classification Search
USPC .......................................... 359/871, 265–275
See application file for complete search history.

(56) References Cited

OTHER PUBLICATIONS

International Search Report dated Feb. 4, 2021 of International application No. PCT/EP2020/070782.
Written Opinion dated Feb. 4, 2021 of International application No. PCT/EP2020/070782.

\* cited by examiner

INTERIOR REARVIEW DEVICE WITH HUMAN MACHINE INTERFACE AND VEHICLE THEREWITH

CROSS-REFERENCE TO RELATED APPLICATION

This application is a National Stage Entry of International Patent Application No. PCT/EP2020/070782, filed on Jul. 23, 2020, which claims the benefit of priority to German Patent Application No. DE 10 2019 120 382.1, filed on Jul. 29, 2019, each of which is hereby incorporated by reference in its entirety for all purposes.

BACKGROUND

1. Field

The present disclosure refers to an interior rearview device with human machine interface and vehicle therewith.

2. Related Art

There are numerous different interior rearview devices available on the market with different functionalities controlled by different operation devices. In the following a brief introduction to the broad spectrum of such devices is given.

A rearview device including a housing, a bezel and a rearview element used for vehicles is known from WO 2018/167096 A1 of the applicant. In one embodiment the bezel includes a transparent or chrome-based coating to allow one or more lighting assemblies positioned in or beneath the bezel to illuminate the surrounding and provide different functions to the driver or other persons. For example, different indicator functions can be provided. Different electronic means may be placed in or beneath the bezel to optimize the used space inside the rearview device.

Further, it is known to provide an interior rearview device with an human machine interface (HMI), in particular comprising a capacitive touch panel. WO 2015/001496 A1 of the applicant discloses a capacitive touch panel comprising a transparent panel substrate, a front surface of the substrate comprising a conductive translucent layer which, in use, is visible to a user; at least one light source associated with the back surface, wherein said light source is switchable between an 'on' state in which an illuminated icon is visible on the front surface of the cover panel and an 'off' state in which the illuminated icon is not visible on the front surface of the cover panel, wherein the light source is switchable from the off state to the on state by a change in capacitance of the conductive translucent layer; and at least one switch associated with the back surface, wherein the switch is activable by a user pressing the touch panel in the vicinity of the illuminated icon to provide an output signal capable of performing a function.

But also HMIs making usage of the Time-of-Flight principle (ToF) for measuring the distance between a sensor and an object, based on the time difference between the emission of a signal and its return to the sensor, after being reflected by an object, are used in rearview devices. For example US 2017/160874 A1 of the applicant describes an interior rearview mirror of a motor vehicle having an operating device with an operating surface which is arranged in a frame of a mirror element or adjacent to the mirror element or in an illumination module of the inner mirror, for an adjusting or dimming of the interior rearview mirror, adjusting of at least one exterior rearview mirror, opening of at least one window, setting an air conditioning system, switching a warning signal or similar. The operating device comprises at least one ToF sensor for emitting transmission signals in the form of light, receiving reception signals, and outputting information signals; at least one optical waveguide for guiding the transmission signals from the ToF sensor to at least one deflection point, and guiding deflection signals deflected at the deflection point to at least one assigned exit point acting as an operating element on a first surface of the optical waveguide, the first surface acting as an operating surface, in response to an object, in the form of a finger of a user, approaching the exit point or touching same for guiding reception signals deflected at the object; and a control unit, which triggers at least one function assigned to the operating element or the exit point dependent on the information signals outputted by the ToF sensor dependent on the reception signals, wherein the deflection point is provided on a second surface which is opposite to the first surface of the optical waveguide and constitutes a deflection surface of the optical waveguide via an extraction element, and wherein the ToF sensor comprises a transmitter for emitting the transmission signals in the beam path before a first end of the optical waveguide having a coupling surface and a receiver for receiving the reception signals when deflection at the exit point also before the first end of the optical waveguide.

US 2012/0236388 provides an interior rearview mirror assembly that includes a casing and an electro-optic reflective element (such as an electrochromic reflective element) attached to or adhered to a surface or portion of the casing or bezel, with no bezel portion overlapping or encompassing a perimeter edge or front surface of the reflective element. The known interior rearview mirror assembly includes a housing and a mirror reflective element having a glass substrate. The housing includes an element that protrudes beyond a rear surface of the glass substrate and towards the front surface of the glass substrate when the reflective element is at least partially received at the housing. The glass substrate includes a slanted rear perimeter edge-portion along a perimeter circumference of the rear surface of the glass substrate to at least partially accommodate the element of the housing when the reflective element is at least partially received at the housing. The glass substrate includes a beveled front perimeter along a perimeter circumference of the front surface of the glass substrate. The beveled front perimeter of the glass substrate is exposed and viewable by the driver of the vehicle.

DE 10 2015 201 901 A1 refers to a method for determining a position of an object external to the vehicle in a vehicle. In the method, a reference depth map is recorded using a detection device. For pixels of a detection area, the reference depth map in each case specifies distance information between the detection device and a surface of an object at the respective pixel, while the non-vehicle object is not in the detection area. Furthermore, a current depth map is recorded with the detection device while the object outside the vehicle is located in the detection area. Depth differences are determined for pixels of the detection area and the position of the object external to the vehicle is determined as a function of the depth differences.

SUMMARY

Despite the large amount of interior rearview mirrors known, there is still the need to enhance functionality and design of the same. The object of the present disclosure is to provide an optically appealing interior rearview device with an easy to actuate human machine interface.

The object of the present disclosure is archived by an interior rearview element comprising at least one of a reflective element and a display element; a bezel surrounding the rearview element and being surrounded by a housing; a mount assembly which is configured to attach the housing to the vehicle; and an human machine interface (HMI) for controlling at least one function of the interior rearview device, with the HMI comprising at least one ToF sensor, between the housing and the rearview element, and at least a part of the bezel, preferably at the bottom of the interior rearview device. According to the present disclosure, the bezel comprises a transparent or translucent substrate provided with a chromium-based reflective coating; with at least one opening or region of reduced thickness of the coating being provided on the substrate, in particular in form of laser edged element or cut-out button, and/or being hidden by the coating until the at least one light source is lit. The form of the at least one opening or region of reduced thickness of the coating is providing at last one logo, sign, mark, icon and/or information on a function to be actuated via the HMI.

Preferred embodiments of the present disclosure are characterized by at least one light source between the housing and the rearview element for emitting light through the bezel, with the bezel preferably acting as a light guide to illuminate at least a region between the housing and the rearview element and/or being comprised by the HMI.

It is proposed that the at least one light source comprises a light assembly configured to direct a plurality of different color lights to an entire surface of the bezel so that the entire bezel can have one color at a time, and/or to provide a plurality of different color lights to different zones of the bezel so that different zones of the bezel can have different colors at a time, and/or to direct light of a selected brightness and/or color to at least one selected region or the entire surface of the bezel.

With the present disclosure is further proposed that the at least one light source is comprised by the at least one ToF sensor and/or comprises LEDs, in particular on a printed circuit board and/or in form of infrared light-emitting diodes.

Preferred embodiments of the present disclosure are characterized by at least one light guide for light from and to the ToF sensor and/or the at least one light source, with the light guide preferably being provided with at least one light receiving surface, at least one light deflection surface, in particular in form of a reflection surface, and/or at least one light exiting surface.

It is preferred that the at least one light receiving surface comprises at least one lens and/or light coupling element for ToF sensor light and/or LED light, and/or the at least one light deflection surface comprises at least one light guiding element and/or recess, and/or the at least one light exiting surface comprises at least one light extraction element and/or at least one logo, sign, mark, icon and/or information on a function to be actuated via the HMI.

It is also proposed that there is a plurality of openings or regions of reduced thickness, with said openings or regions preferably having different forms.

Embodiments of the present disclosure are characterized in that the perimeter edge of the bezel is exposed to and is viewable by the driver of the vehicle when said device is normally mounted in the vehicle; and/or the perimeter edge of the Bezel comprises a curved surface disposed between the front and/or reflective surface of the rearview element and the housing, with the housing preferably being provided with a protrusion projecting edgewise, beyond the curved surface of the perimeter edge such that it is viewable by the driver when said device is normally mounted in the vehicle.

Preferred devices of the present disclosure are characterized in that only the perimeter edge and/or the curved surface is provided with the chromium-based coating, and/or only the perimeter edge and/or the curved surface is provided with the at least one opening or region of reduced thickness of the coating, and/or only the perimeter edge and/or the curved surface is providing the light guide.

With the present disclosure is also proposed that the bezel is provided by a housing cover, with at least one printed circuit board, the at least one ToF sensor, the one or more light source, and/or the at least one light guide is/are positioned at least partly between the housing cover and the housing, preferably on a back plate of the housing cover.

It is also proposed that the housing cover comprises a support part for the reflective element, preferably in form of a front plate, and/or is provided with at least one opening, in particular for wires.

Still further, it is proposed that the at least one ToF sensor comprises a ToF camera and/or is connected to control means.

In addition, it is proposed that the control means is suited to detect motion patterns within a first spacing interval relative to the reflective surface and/or provides at least one virtual button or key within a second spacing interval, with preferably the first spacing interval being provided in the first region of the control means and the second spacing interval being provided in the second region of the control means, in particular the second spacing interval being arranged closer to the reflective surface than the first spacing interval.

Still further, with the present disclosure it is proposed that the control means is configured to be connected to a control unit of the vehicle, in particular to take the state of the vehicle and/or the surroundings of the vehicle into consideration when controlling the device and/or the reflective element.

It is preferred that the reflective element comprises an electrochromic (EC) element.

The present disclosure also provides a vehicle equipped with an interior rearview device of the present disclosure.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the present disclosure is not limited to the precise arrangements and instrumentalities shown. The accompanying drawings, which are incorporated in and constitute a part of this specification, illustrate an implementation of devices consistent with the present present disclosure in a schematic manner and, together with the description, serve to explain advantages and principles consistent with the present disclosure.

FIGS. 3a to 3c each is a perspective view of the back of a housing cover carrying alternative HMI elements, with FIG. 3a being associated with the embodiment of FIG. 2a and FIG. 3b being associated with the embodiment of FIG. 2b, whereas FIG. 3c provides an alternative to FIG. 3a;

FIG. 5b is a section along A-A of FIG. 5a;

FIG. 6b is a section along A-A of FIG. 6a;

DETAILED DESCRIPTION

Figure 1:
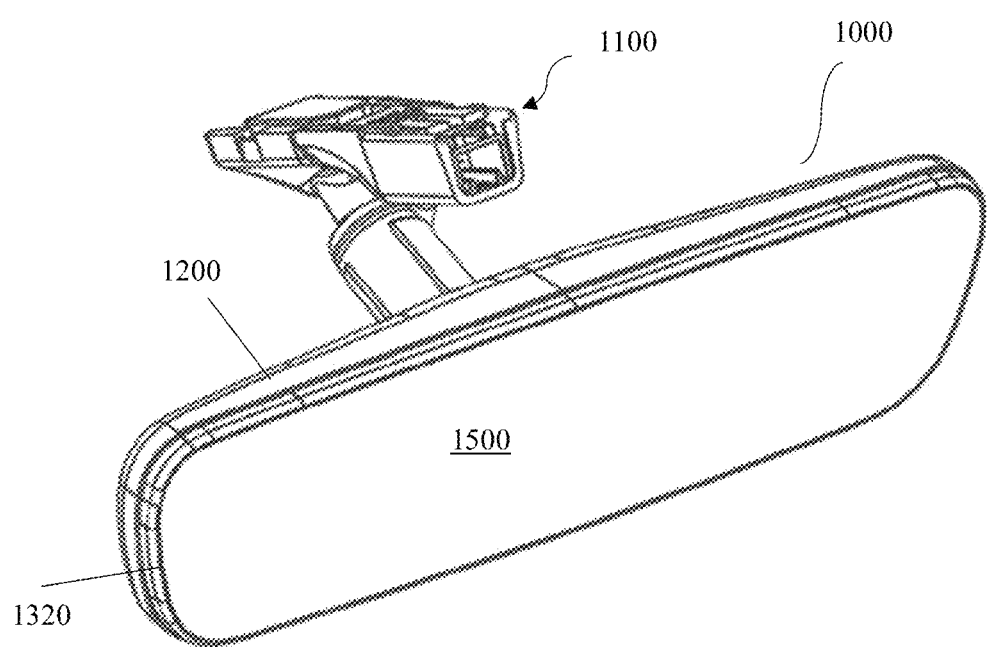
FIG. 1 is a perspective view of an interior rearview device of the present disclosure.

Before explaining examples of the present disclosure in detail, it is to be understood that the present disclosure is not limited in its application to the details of construction and to the arrangements of the components set forth in the following description or illustrated in the drawings. The figures and written description are provided to teach any person skilled in the art to make and use the present disclosure for which patent protection is sought. The present disclosure is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present disclosures will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," "corner," are used in the description for clarity in specific reference to the figures and are not intended to limit the scope of the present disclosure or the appended claims. Further, it should be understood that any one of the features of the present disclosure may be used separately or in combination with other features. Other systems, methods, features, and advantages of the present disclosure will be or become apparent to one with skill in the art upon examination of the figures and the detailed description. It is intended that all such additional systems, methods, features, and advantages be included within this description, be within the scope of the present disclosure, and be protected by the accompanying claims.

FIG. 1 shows a perspective view of an rearview device, which is suited for implementing the present disclosure. The rearview device 1000 comprises a mount assembly 1100 to be mounted to a not shown vehicle and carrying a housing 1200 to which a housing cover with a bezel 1320 is attached, with the housing cover 1300 carrying a rearview element 1500, for example in form of an electrochromic (EC) glass, as can be seen in FIGS. 2a and 2a.

Figure 2A:
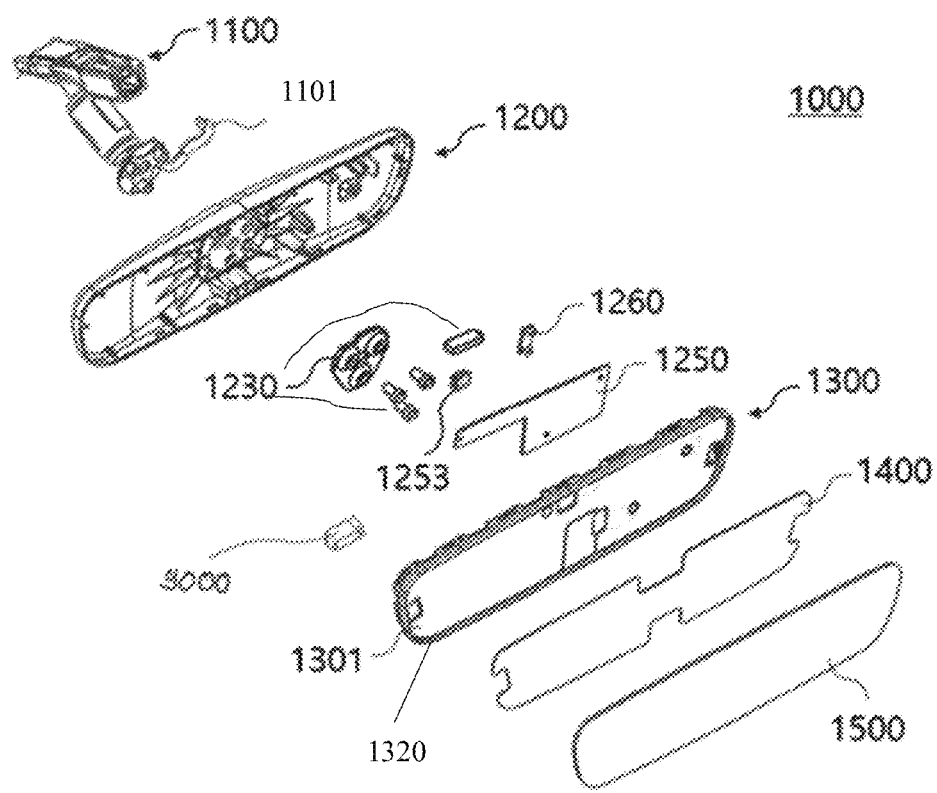
FIGS. 2a and 2b show two different embodiments of the interior rearview device of FIG. 1, in exploded view.

FIG. 2a provides an explodes view of a first embodiment of the present disclosure, showing the interior of the rearview device 1000. Between the housing 1200 and the housing cover 1300 fastening means 1230, a printed circuit board 1250 supported by a circuit board support 1253 and further mounting means 1260, and a ToF sensor 9000 are arranged; and the front plate 1301 carries the rearview element 1500 with an adhesive 1400 there between.

The ToF sensor 9000 can in particular be provided with a ToF camera, which acts as a 3D camera systems and, when a scene is illuminated by means of transmission signals in the form of light pulses, measure the time for each image point which the light needs to travel to an object and back again. The time required is directly proportionate to the distance. The camera thus delivers the distance of the object respectively recorded for each image point. A particular advantage of the ToF camera is that efficient suppression of external light (e.g. sunshine) is achieved, since active transmission signals can be filtered out of ambient light. For that purpose, the ToF sensor 9000 can be provided with at least one light source for example comprising light-emitting diodes (LEDs), in particular infrared light-emitting diodes, which are suited for gesture control. Those LEDs can be used in order to illuminate a defined space to be monitored. The ToF camera can be located in a centre as a receiver which can detect a change in the lighting conditions to form a human machine interface (HMI). More precisely, for each of its pixels the ToF camera can detect the time that the light emitted by the LEDs takes to get to e.g. the hand of a human and back again. This time is directly proportional to distance. As a result, gesture control can be implemented within a first predefined distance interval, while a virtual button or key can also be provided within the second predefined distance interval, as described below.

Figure 2B:
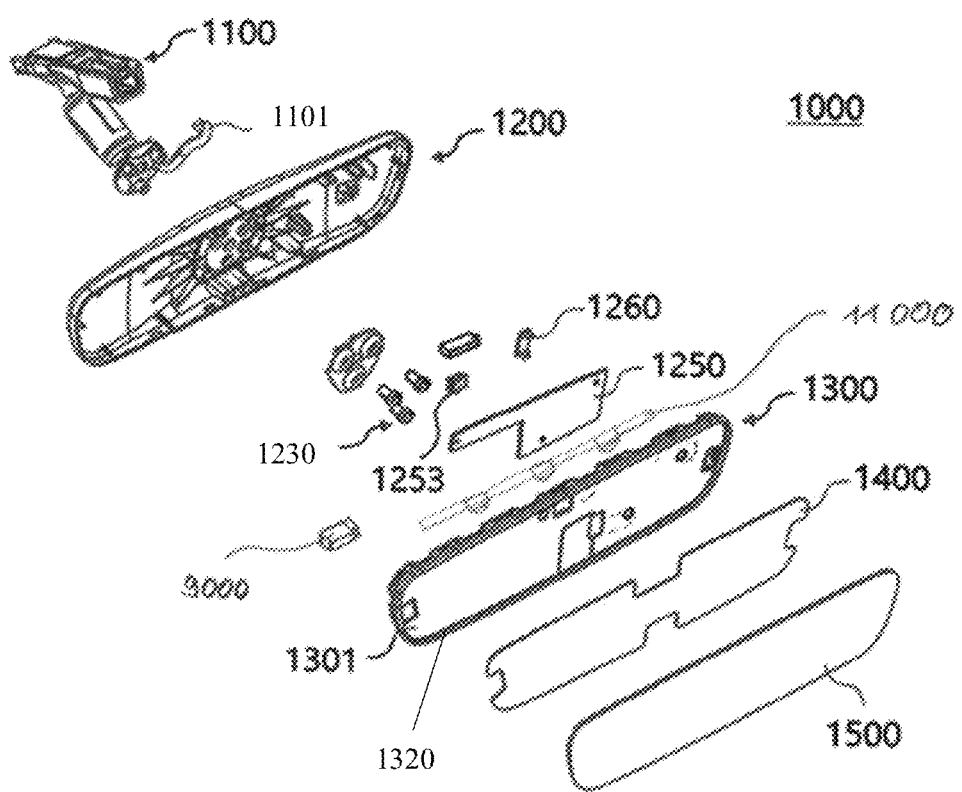

In an alternative second embodiment of the present disclosure as shown in FIG. 2b, in addition to the ToF sensor 9000 a printed circuit board 11000 carrying three LEDs is arranged between the housing 1200 and the housing cover 1300. In this alternative, the ToF sensor 9000 as such is not provided with an illumination source.

Figure 3A:
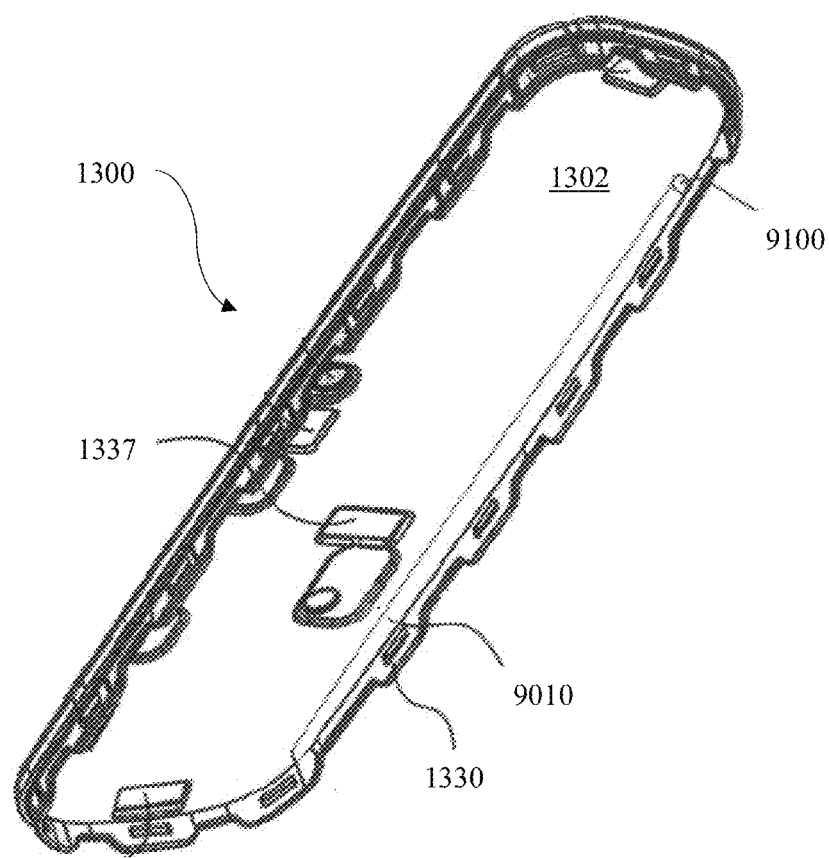
Figure 3B:
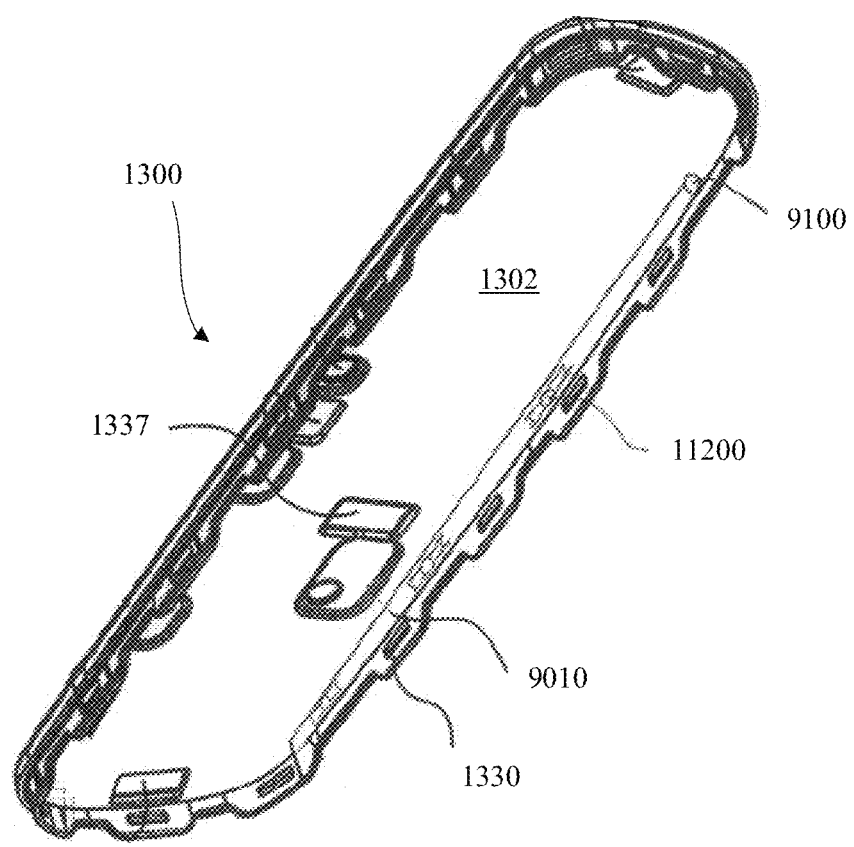
Figure 3C:
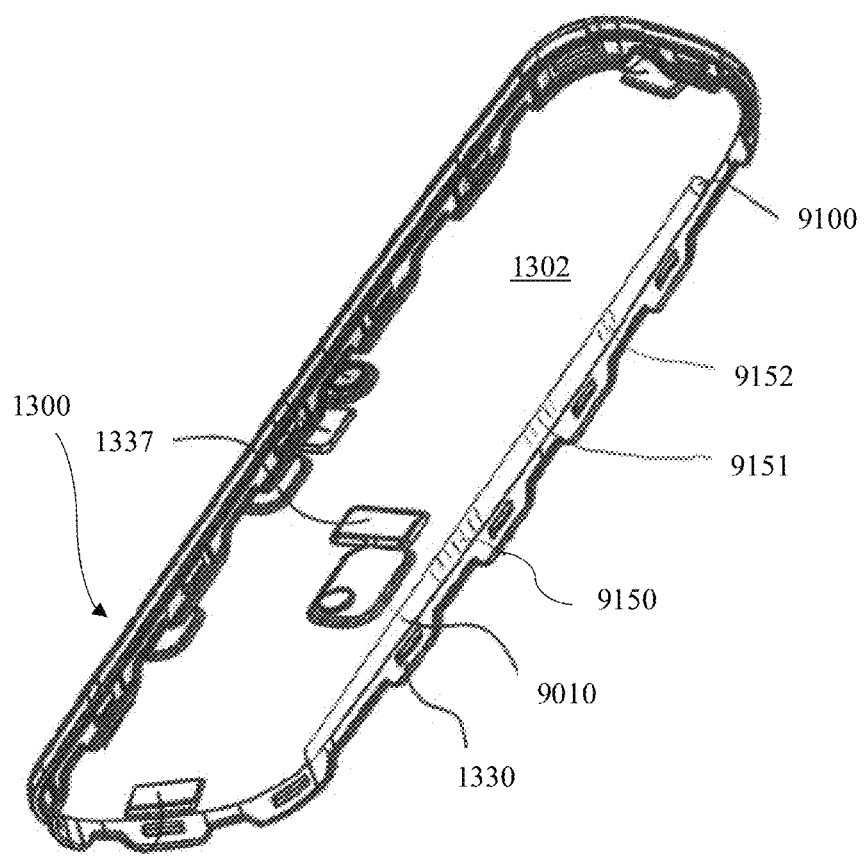

Before turning to the functioning of the ToF sensor 9000 with or without LEDs, it is turned to FIGS. 3a to 3c all depicting a light guide 9010 which is suited for the propagation of light from the ToF sensor 9000 and/or the LEDs on the printed circuit board 11000. The light guide 9010 is provided with at least one light coupling element for the ToF sensor 9000. The light guide 9010 shown in FIG. 3a is suited for the first embodiment, but in case usage is made of the LEDs on the printed circuit board 11000, the light guide 9010 is also provided with three additional light coupling elements 11200 as shown in FIG. 3b, with each additional light coupling element 11200 being associated with one LED. Still further, as shown in FIG. 3c, the light guide 9010 can be provided with light guiding elements 9150, 9151, 9152, each of which deflect light from the back of the light guide 9010 to the front thereof. For further details of such light guiding elements and their functioning, reference is made to US 2017/0160974.

In FIGS. 3a to 3c, in addition, it can be seen that the housing cover 1300 is carrying the light guide 9010 on its back plate 1302 and is provided with a plurality of protrusions 1330 for the attachment to the housing 1200. In addition, the housing cover 1300 is provided with a plurality of openings, like the opening 1337 to enable an electrical connection by guiding wires like the wire 1101 from the mount assembly 1100 through the housing 1200 and the housing cover 1300 for example for connecting to the electrodes of the EC glass of the rearview element 1500. The EC glass can make usage of EC cell as described e.g. in US 2018/0307112 A1.

Figure 4A:
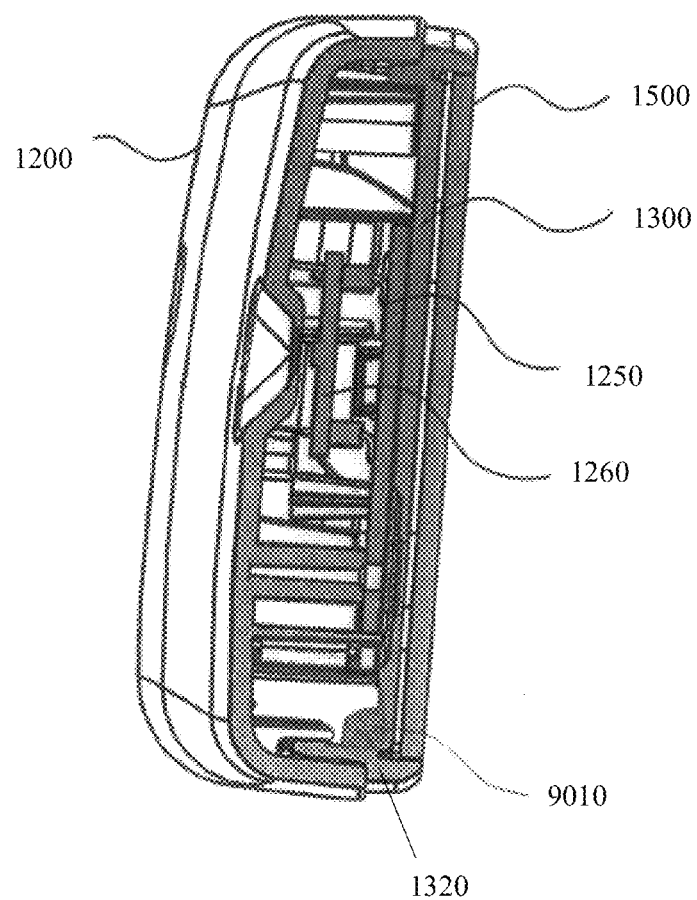
FIGS. 4a and 4b are cross-sections through the embodiment of FIGS. 2a and 2b.

FIG. 4a shows a cross section of the first embodiment interior rearview device 1000 of FIGS. 2a and 3a, according to which the light guide 9010 is arranged immediately behind the bezel 1320 provided by the housing cover 1300, either as a separate part or formed together with the bezel 1320 as described with respect to FIGS. 5a to 6c below.

Figure 4B:
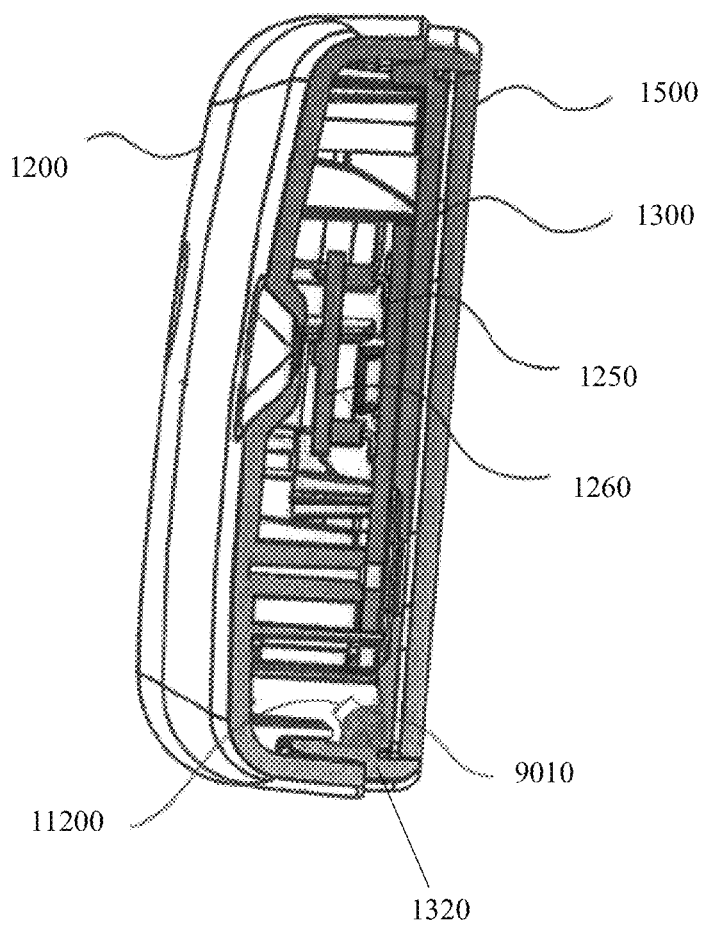

In case LEDs are provided separately from the ToF sensor 9000 according to the second embodiment shown in FIG. 2b, the light guide 9010 is provided with the additional light coupling elements 11200 discussed with respect to FIG. 3b above and also shown in FIG. 4b.

As already mentioned, the light guide 9010 can be formed together with the bezel 1320 as illustrated in FIGS. 5a to 6c in further detail. In fact, for that purpose the housing cover 1300 at least in the region of the bezel 1320 is formed from a transparent and/or translucent substrate, in particular a polymer substrate, which is covered with a chromium-based coating 12000 in the region of the bezel 1320 in order to provide a pleasing metallic appearance. The chromium-based coating allows the transmission of light and for further details thereof reference is made to EP 2 807 284 B1 of the applicant.

Figure 5A:
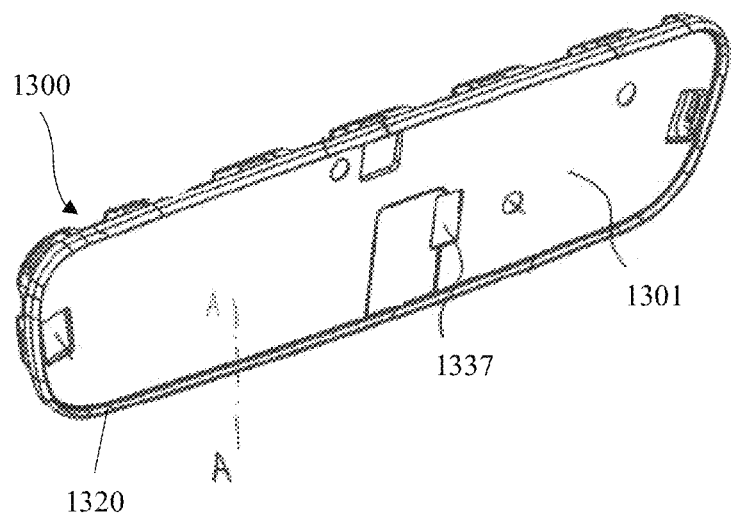
FIG. 5a is a perspective view of the front of a housing cover with integrated HMI elements.
Figure 5B:
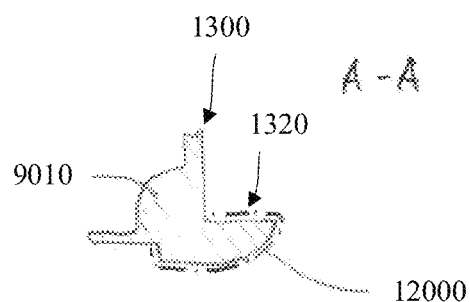
Figure 5C:
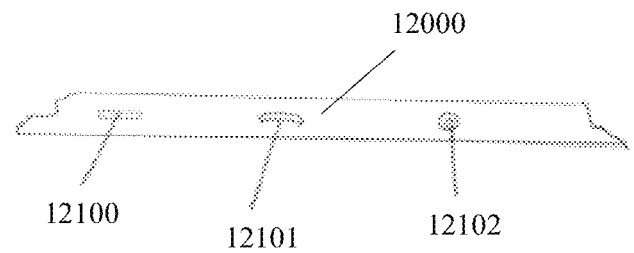
FIG. 5c is a front view of the HMI elements of FIGS. 5a and 5b.
Figure 6A:
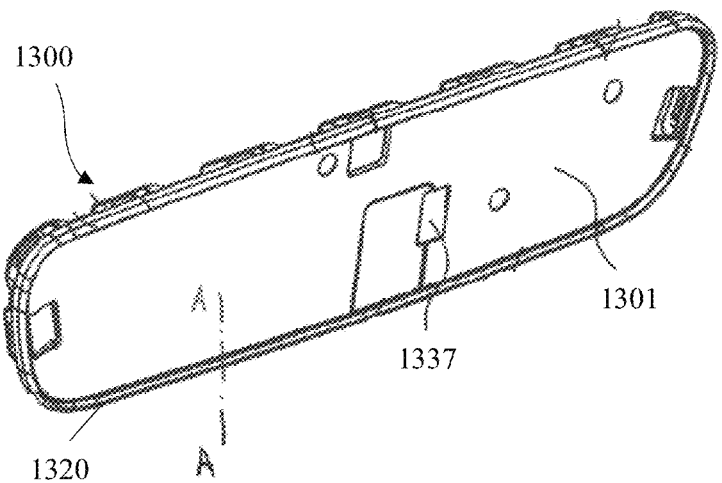
FIG. 6a is a perspective view of the front of a housing cover with alternative, integrated HMI elements.
Figure 6B:
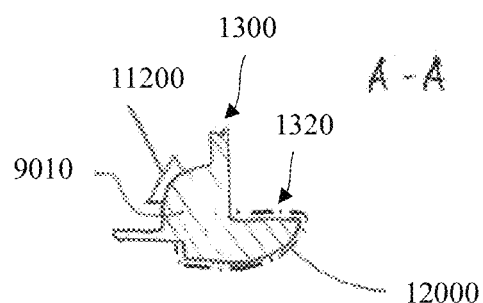
Figure 6C:
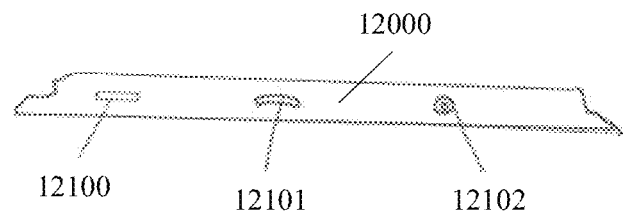
FIG. 6c is a front view of the HMI elements of FIGS. 6a and 6b.

The coating 12000 is provided with laser edge elements 12100, 12101, 12102 which are shown in FIGS. 5c and 6c and provide virtual buttons or keys as they allow the transmission of light from the ToF sensor 9000 and/or the LEDs on the printed circuit board 11000 in order to detect the approach of the finger of a user of the HMI, in particular a driver.

With the first embodiment shown in FIGS. 5a to 5c, the ToF sensor 9000 allows to detect the actuation of one of three keys provided by the laser edged elements 12100, 12102, 12102, in order to selectively activate three functions, like dimming the rearview element 1500, locking the door of the vehicle and illuminating the driving cabin. The different forms of three laser edged elements 12100, 12102, 12102 allows to allocate each form to a function, wherein the form can correspond to a logo or any sign transmitting an information on the corresponding function. For further details of the functioning of said laser edged element 12100, 12101, 12102, again reference is made to the disclosure provided by US 2017/0160874 A1.

The second embodiment shown in FIGS. 6a to 6c differs from the first embodiment shown in FIGS. 5a to 5c only by the addition of the light coupling elements 11200 for the light from the LEDs on the printed circuit board 11000 and already being described with respect to FIGS. 2b and 4b.

Figure 7:
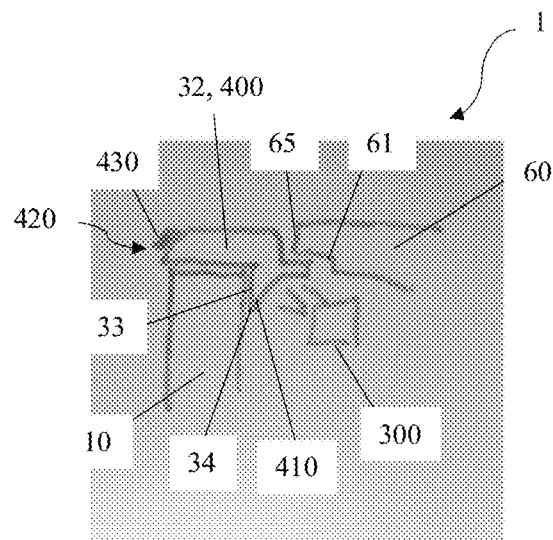
FIG. 7 is a cross-section through a part of a further interior rearview device of the present disclosure with further alternative HMI elements.

FIG. 7 shows an alternative interior rearview device 1 of the present disclosure with a light assembly 300 with one or more light sources, in particular in form of LEDs, being arranged to emit light directly into a bezel 32 of a housing cover, with the bezel 32 acting as a support part 33 for an EC glass 10 and as a light guide 400. For the second purpose, a light coupling element in form of a light receiving surface 410 with additional lens function is provided by the light guide 400, and the light guide 400 directs the light from the light assembly 300 to a light emitting surface 420 in the region of a rounded edge 31 of the bezel 32 between the rearview element in form of the EC glass 10 and a housing 60. This arrangement allows, for example, to provide a plurality of different optical effects with light of different intensities and/or colors being provided between the EC glass 10 and the housing 60.

Both, the intensity and the color of the light originating from the light assembly 300 can provide information to the driver or just serve to enhance the appeal of the interior rearview device 1. In addition to those light effects, the embodiment shown in FIG. 7 allows for a very simple HMI by providing the light emitting surface 420 e.g. with a laser cut-out virtual button or key 430 and, thus, providing actuation means. For example, when approaching the key 430 with a finger light will be reflected back into the light guide 400 and in case the light assembly 300 is also provided with sensor means can be detected in order to detect an actuation. According to the present disclosure, the light assembly 300 belongs to a ToF sensor.

The support part 33 and the bezel 32 are comprised by the housing cover, which also is provided with an opening 34 for wires (not shown).

Figure 8:
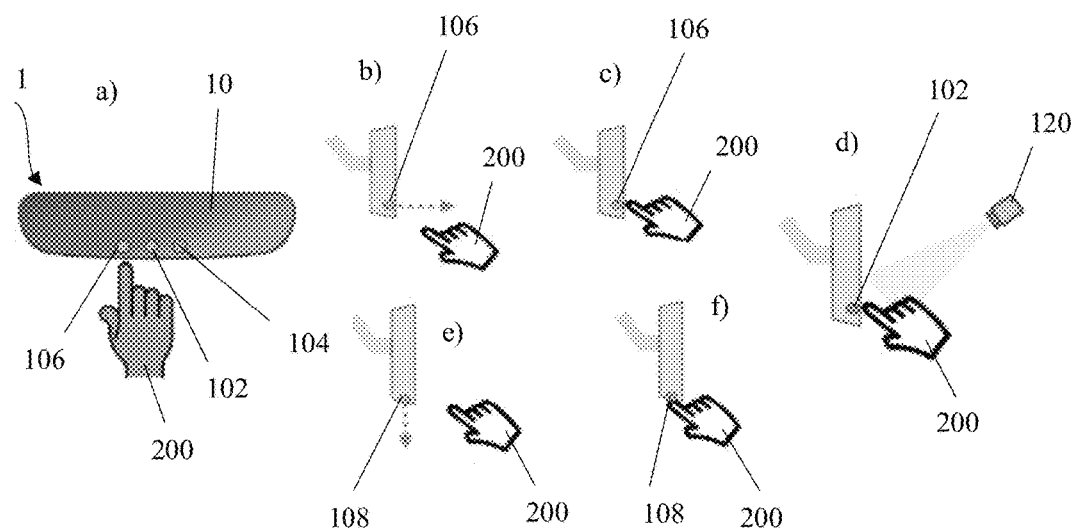
FIGS. 8a to 8f illustrates the functioning of an HMI of an interior rearview device of the present disclosure.

With respect to FIG. 8 in the following one example of an HMI of the multi-functional rearview device 1 of the present disclosure is described. As can be seen in FIG. 8a, three sensors 102, 104 and 106 are provided on the reflective surface of the EC glass 10. A first sensor 102 can be in form of a ToF sensor, a second sensor 104 can be in form of a touch sensor, whereas the third sensor 106 can be a photo electric sensor.

FIGS. 8b and 8c explain the functioning of the photo electric sensor 106. For example such a sensor can be provided as a photo coupler emitting and receiving light, such that as long as no light is detected, as shown in FIG. 6b, no actuation is detected. However, as soon as the hand 200 of for example the driver approaches the sensor 106 as shown in FIG. 6c a reflection takes place as a finger blocks the light and reflects the same. In this case, an actuation intention of the driver is detected and, for example, the dimming of the EC glass 10 is changed as a result thereof.

In order to better detect a gesture of a hand 200 in front of an interior rearview device 1 of the present disclosure, in addition to the sensor 102 a camera 120 might be used as shown in FIG. 8d.

In addition to or as an alternative of providing sensors 102, 104, 106 on the EC glass 10, a ToF sensor 108 is provided in the bottom of the rearview device 1 as shown in FIG. 6e. The respective sensor 108 is suited for detecting the approach of a finger of the hand 200 as shown in FIG. 8f. Said ToF sensor 108 corresponds substantially to the ToF sensor described with reference to FIGS. 2a to 6c, with an analogue arrangement within the rearview device 1.

The usage of only the ToF sensor 108, without the sensors 102, 104, 106, provides a touchless actuation and therefore avoids fingerprints on the EC glass 10. Such fingerprints can leads to a distraction of the driver when observing the rear of the vehicle and can lead to a malfunctioning of the HMI when wanting to actuate a selected function via the HMI.

Accordingly, with the present disclosure HMIs with ToF sensors each placed between a housing and a rearview element of a rearview device, in particular on a housing cover or within a bezel of the housing cover, and can be combined with a multitude of further sensors and/or light sources.

The various embodiments of the interior rearview device of the present disclosure described above illustrate not only HMI functions thereof, but are also comprising lighting functions for decorative and/or informative purposes, combined with a particular pleasing aesthetic appeal due to the chromium-based coating.

It will be appreciated by those skilled in the art that the present disclosure is not restricted in its use to the particular application described. Neither is the present disclosure restricted in its preferred embodiments with regard to the particular elements and/or features described or depicted herein. It will be appreciated that the present disclosure is not limited to the embodiment or embodiments disclosed, but is capable of numerous rearrangements, modifications and substitutions without departing from the scope of the present disclosure as set forth and defined by the following claims.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

REFERENCE SIGNS 1 rearview device
10 EC glass
31 rounded edge
32 bezel
33 support part
34 opening
60 housing
61 step
65 protrusion
102 sensor
104 sensor
106 sensor
108 ToF sensor
120 camera
200 hand
300 light assembly with sensor means
400 light guide
410 light receiving surface
420 light emitting surface
430 laser cut out virtual button
1000 rearview device
1100 mount assembly
1101 wire
1200 housing
1230 fastening means
1250 printed circuit board
1253 circuit board support
1260 mounting means
1300 housing cover
1301 front plate
1302 back plate
1320 bezel
1330 protrusions
1337 opening for electrical connection
1400 adhesive
1500 rearview element
9000 ToF sensor
9010 light guide
9100 light coupling element
9150 light guiding element
9151 light guiding element
9152 light guiding element
11000 printed circuit board with LEDs
11200 light coupling element
12000 chrome coating
12100 laser edged element
12101 laser edged element
12102 laser edged element

The invention claimed is:

1. An interior rearview device adapted for use with a motor vehicle, comprising:
a rearview element comprising at least one of a reflective element or a display element;
a bezel surrounding the rearview element and being surrounded by a housing;
a mount assembly configured to attach the housing to the vehicle; and
a human machine interface (HMI) for controlling at least one function of the interior rearview device, with the HMI comprising at least one time-of-flight (ToF) sensor, between the housing and the rearview element, and at least a part of the bezel,
wherein the bezel comprises a transparent or translucent substrate provided with a reflective coating, with at least one region of reduced thickness of the reflective coating being provided on the substrate and covering at least one virtual button or key, and
wherein the at least one virtual button or key is hidden by the at least one region of reduced thickness of the reflective coating until the at least one light source is lit, and
wherein the at least one virtual button or key provides at least one logo, sign, mark, icon or information on a function to be actuated via the HMI.

2. The device of claim 1, comprising:
at least one light source between the housing and the rearview element for emitting light through the bezel, with the bezel acting as a light guide to illuminate at least a region between the housing and the rearview element and/or being comprised by the HMI.

3. The device of claim 2, wherein,
the at least one light source comprises a light assembly configured to,
direct a plurality of different color lights to an entire surface of the bezel so that the entire bezel can have one color at a time,
provide a plurality of different color lights to different zones of the bezel so that different zones of the bezel can have different colors at a time, or
direct light of a selected brightness and/or color to at least one selected region or the entire surface of the bezel.

4. The device of claim 2, wherein the at least one light source is comprised by the at least one ToF sensor and/or comprises LEDs.

5. The device of any of claim 2, comprising:
at least one light guide for light from and to the ToF sensor and the at least one light source,
with the light guide being provided with at least one light receiving surface, at least one light deflection surface in form of a reflection surface, and at least one light exiting surface.

6. The device of claim 5, wherein
the at least one light receiving surface comprises at least one lens or light coupling element for the ToF sensor light and LED light,
the at least one light deflection surface comprises at least one light guiding element or recess, and/or
the at least one light exiting surface comprises at least one light extraction element and the at least one logo, sign, mark, icon or information on a function to be actuated via the HMI.

7. The device of claim 1, wherein
the at least one region of reduced thickness of the reflective coating is provided on the substrate in form of a laser edged element or cut-out button, and
the at least one ToF sensor is provided at the bottom of the interior rearview device.

8. The device of claim 1, wherein
the form of the at least one region of reduced thickness of the reflective coating is providing the at last one logo, sign, mark, icon or information on a function to be actuated via the HMI.

9. The device of any of claim 1, wherein
the perimeter edge of the bezel is exposed to and is viewable by the driver of the vehicle when said device is mounted in the vehicle; and
the perimeter edge of the bezel comprises a curved surface disposed between the front or reflective surface of the rearview element and the housing,
the housing being provided with a protrusion projecting edgewise, beyond the curved surface of the perimeter edge such that it is viewable by the driver when said device is mounted in the vehicle.

10. The device of claim 9, wherein
only the perimeter edge and the curved surface is provided with the chromium-based coating, or
only the perimeter edge and the curved surface is provided with the at least one region of reduced thickness of the reflective coating, and
only the perimeter edge and the curved surface is providing the light guide.

11. The device of claim 1, wherein
the bezel is provided by a housing cover, and
at least one printed circuit board, the at least one ToF sensor, the one or more light source, and the at least one light guide are positioned at least partly between the housing cover and the housing on a back plate of the housing cover.

12. The device of claim 11, wherein
the housing cover comprises a support part for the reflective element in form of a front plate, and is provided with at least one opening for wires.

13. The device of claim 1, wherein
the at least one ToF sensor comprises a ToF camera and is connected to a control means.

14. The device of claim 13, wherein the control means is suited to detect motion patterns within a first spacing interval relative to the reflective surface and provides at least one virtual button or key within a second spacing interval, with the first spacing interval being provided in the first region of the control means and the second spacing interval being provided in the second region of the control means, the second spacing interval being arranged closer to the reflective surface than the first spacing interval.

15. The device of claim 13, wherein the control means is configured to be connected to a control unit of the vehicle to take the state of the vehicle and the surroundings of the vehicle into consideration when controlling the device or the reflective element.

16. The device of claim 1, wherein the reflective element comprises an electrochromic (EC) element.

17. A vehicle equipped with an interior rearview device of claim 1.

18. The device of claim 1, wherein
the at least one virtual button or key is formed by at least one laser edge element,
light transmitted through the at least one laser edge element is visible through the at least one region of reduced thickness of the reflective coating, and
when light is not being transmitted through the at least one laser edge element, the at least one laser edge element is not visible through the at least one region of reduced thickness.

* * * * *